(12) United States Patent
Xie et al.

(10) Patent No.: US 12,144,773 B2
(45) Date of Patent: Nov. 19, 2024

(54) REHABILITATION ROBOT TRAINING SYSTEM FOR MONITORING AND SUPPRESSING COMPENSATORY MOVEMENT OF HEMIPLEGIC UPPER LIMB

(71) Applicant: SOUTH CHINA UNIVERSITY OF TECHNOLOGY, Guangzhou (CN)

(72) Inventors: Longhan Xie, Guangzhou (CN); Siqi Cai, Guangzhou (CN); Guofeng Li, Guangzhou (CN); Shuangyuan Huang, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 602 days.

(21) Appl. No.: 17/600,122

(22) PCT Filed: Oct. 31, 2019

(86) PCT No.: PCT/CN2019/114917
§ 371 (c)(1),
(2) Date: Sep. 30, 2021

(87) PCT Pub. No.: WO2020/211331
PCT Pub. Date: Oct. 22, 2020

(65) Prior Publication Data
US 2022/0168167 A1  Jun. 2, 2022

(30) Foreign Application Priority Data
Apr. 18, 2019 (CN) .......................... 201910314565.X

(51) Int. Cl.
*A61H 1/02* (2006.01)
*B25J 9/16* (2006.01)

(52) U.S. Cl.
CPC ............ *A61H 1/0274* (2013.01); *B25J 9/163* (2013.01); *B25J 9/1664* (2013.01);
(Continued)

(58) Field of Classification Search
CPC .......... A61H 1/0274; A61H 2201/1638; A61H 2201/1659; A61H 2230/625; B25J 9/163; B25J 9/1664; G05B 2219/45109
See application file for complete search history.

(56) References Cited

U.S. PATENT DOCUMENTS

2011/0264018 A1* 10/2011 Matjacic .............. A61H 1/0274
601/40
2022/0168167 A1* 6/2022 Xie ........................ A61H 23/02

FOREIGN PATENT DOCUMENTS

CN  1972732   5/2007
CN  202459994  10/2012
(Continued)

OTHER PUBLICATIONS

Li, Chengliang et al., "The virtual training method of upper extremities with the supporting of recognition of compensative motor," Chinese Journal of Rehabilitation Medicine, vol. 27, No. 8, Aug. 2012, pp. 732-737.
(Continued)

*Primary Examiner* — Bruce E Snow
(74) *Attorney, Agent, or Firm* — JCIPRNET

(57) ABSTRACT

Disclosed is a rehabilitation robot training system for monitoring and suppressing the compensatory movement of a hemiplegic upper limb. The system includes an upper computer control center, an interaction display screen, a force feedback glove, a position tracker, upper limb rehabilitation robot tail end connectors, an upper limb rehabilitation robot, a base and a pressure cushion. One upper limb rehabilitation robot tail end connector is mounted on a tail end of each of two robotic arms of the upper limb rehabilitation robot, and the upper limb rehabilitation robot tail end connectors are respectively worn on an upper arm and a forearm of a patient to drive an arm to move; the upper computer control center stores and processes data, collected by the position tracker, the force feedback glove and the pressure cushion in real time, of the patient, and monitors and analyses whether the patient does a compensatory gesture.

8 Claims, 2 Drawing Sheets

(52) U.S. Cl.
   CPC ............... *A61H 2201/1638* (2013.01); *A61H 2201/1659* (2013.01); *A61H 2230/625* (2013.01)

(56) References Cited

FOREIGN PATENT DOCUMENTS

| | | | |
|---|---|---|---|
| CN | 107320285 | | 11/2017 |
| CN | 108154912 | | 6/2018 |
| CN | 109243572 | | 1/2019 |
| CN | 109350453 | * | 2/2019 |
| CN | 109363887 | | 2/2019 |
| CN | 109363888 | | 2/2019 |
| CN | 109567988 | * | 4/2019 |
| CN | 110123573 | | 8/2019 |
| JP | H09248322 | | 9/1997 |

OTHER PUBLICATIONS

Chongyang et al., "Research on motion compensation using robot-assisted movement rehabilitation of upper extremites YAO," Chinese Journal of Rehabilitation Medicine, vol. 25, No. 11, Nov. 2010, pp. 1-6.

"International Search Report (Form PCT/ISA/210)" of PCT/CN2019/114917, mailed on Feb. 3, 2020, with English translation thereof, pp. 1-6.

* cited by examiner

REHABILITATION ROBOT TRAINING SYSTEM FOR MONITORING AND SUPPRESSING COMPENSATORY MOVEMENT OF HEMIPLEGIC UPPER LIMB

CROSS-REFERENCE TO RELATED APPLICATION

This application is a 371 of international application of PCT application serial no. PCT/CN2019/114917, filed on Oct. 31, 2019, which claims the priority benefit of China application no. 201910314565.X, filed on Apr. 18, 2019. The entirety of each of the above mentioned patent applications is hereby incorporated by reference herein and made a part of this specification.

BACKGROUND

Technical Field

The present invention relates to the field of upper limb rehabilitation, and more particularly to a rehabilitation robot training system for monitoring and suppressing a compensatory movement of a hemiplegic upper limb.

Description of Related Art

Cerebrovascular accident, also known as stroke, has the characteristics of high incidence rate, high disability rate, and high mortality rate, and seriously endangers human health. More than half of stroke survivors have a limb dysfunction which is mainly hemiplegia; and the limb dysfunction has a strong impact on the daily work and quality of life of a patient. Clinical practice proves that movement rehabilitation training is effective for the rehabilitation of a hemiplegic upper limb and can greatly improve the recovery degree of the hemiplegic upper limb, thereby drawing a widespread attention. Due to the large number of stroke patients and the extreme shortage of rehabilitation therapists, rehabilitation robots draw wide attention of numerous research institutions both here and abroad. However, in the process of the rehabilitation robotic training, the patient often compensates the movement of a dysfunctional joint by means of other motions, thereby forming an erroneous movement mode, namely compensatory movement, which mainly includes shoulder, elbow, and trunk compensation. The compensatory movement will induce the patient to form an erroneous movement mode, affects the arm rehabilitation training effect of the patient, and is therefore adverse to the recovery of the motor function of the patient.

SUMMARY

In order to solve the problem that the compensatory movement is not monitored or suppressed in the existing rehabilitation training of the hemiplegic upper limb, the present invention provides a rehabilitation robot training system for monitoring and suppressing a compensatory movement of a hemiplegic upper limb. An upper limb rehabilitation robot assists a hemiplegic upper limb to perform rehabilitation movement training, adjusts a movement velocity, a movement range, and an auxiliary force of a training motion according to a compensation monitoring result, and suppresses the compensatory movement of the hemiplegic upper limb. Position trackers are respectively mounted on an upper arm and a forearm of a patient arm, and are used to acquire arm position and posture data of a patient in real time and transmit the acquired arm position and posture data to a host computer control center as a feedback of a control system of the rehabilitation robot. A force feedback glove is worn on a hand of the patient, and is used to acquire palm position and posture data of the patient in real time, transmit the palm position and posture data to the host computer control center as the feedback of the control system of the rehabilitation robot, and stimulate the hand of the patient by means of vibration in a game or a task to provide a tactile feedback for the patient. A pressure cushion is placed on a seat of the patient, and is used to acquire pressure distribution data of the patient in real time, and transmit the pressure distribution data to the host computer control center as the feedback of the control system of the rehabilitation robot. The host computer control center is used to store information of the patient, process the data, and monitor whether the patient does a compensatory motion. An interactive display screen is placed in front of the patient, and is used to display upper limb position and posture information of the patient and the compensation monitoring result in real time, and instruct the patient to suppress the compensatory movement through a voice guidance.

The objective of the present is realized by at least one of the following technical solutions.

A rehabilitation robot training system for monitoring and suppressing a compensatory movement of a hemiplegic upper limb, including a host computer control center, an interactive display screen, a force feedback glove, position trackers, upper limb rehabilitation robot end connectors, an upper limb rehabilitation robot, a base, and a pressure cushion.

The upper limb rehabilitation robot is mounted on the base.

One upper limb rehabilitation robot end connector is mounted at an end of each of two robotic arms of the upper limb rehabilitation robot; the two upper limb rehabilitation robot end connectors are respectively worn on an upper arm and a forearm of a patient arm, and are used to connect the upper limb rehabilitation robot to the patient arm and drive the patient arm to move during rehabilitation training.

The position trackers include a first position tracker and a second position tracker; the first position tracker and the second position tracker are respectively mounted on the forearm and the upper arm of the patient arm, and are used to acquire arm position and posture data of a patient in real time and transmit the acquired arm position and posture data to the host computer control center as a feedback of a control system of the upper limb rehabilitation robot.

The force feedback glove is worn on a hand of the patient, and is used to acquire palm position and posture data of the patient in real time, transmit the palm position and posture data to the host computer control center as the feedback of the control system of the upper limb rehabilitation robot, and stimulate the hand of the patient by means of vibration in a game or a task to provide a tactile feedback for the patient.

The pressure cushion is placed on a seat of the patient, and is used to acquire in real time pressure distribution data of the patient, and transmit the pressure distribution data to the host computer control center as the feedback of the control system of the upper limb rehabilitation robot.

The host computer control center is used to store information of the patient, process the data, and monitor and analyze whether the patient does a compensatory motion.

The interactive display screen is placed in front of the patient, and is used to display upper limb position and posture information of the patient and a compensation monitoring result in real time, and instruct the patient to suppress the compensatory movement through a voice guidance.

Further, the upper limb rehabilitation robot is respectively connected to the upper arm and the forearm of the patient by means of the upper limb rehabilitation robot end connectors, and drives the arm of the patient to perform rehabilitation training; and the upper limb rehabilitation robot adjusts a movement velocity, a movement range and an auxiliary force for driving the arm of the patient to move, and suppresses the compensatory movement of the patient.

Further, upper limb position and posture information of the patient includes the arm position and posture data of the patient acquired by the first position tracker and the second position tracker and the palm position and posture data of the patient acquired by the force feedback glove.

Further, the arm position and posture data of the patient acquired in real time by the first position tracker and the second position tracker includes the position and posture of the forearm $(x_1, y_1, z_1, \theta_{1x}, \theta_{1y}, \theta_{1z})$ and the position and posture of the upper arm $(x_2, y_2, z_2, \theta_{2x}, \theta_{2y}, \theta_{2z})$, wherein $x_1$, $y_1$, and $z_1$ denote three-dimensional coordinates of the forearm; $\theta_{1x}$, $\theta_{1y}$, and $\theta_{1z}$ denote three-dimensional angles of the forearm; $x_2$, $y_2$, and $z_2$ denote three-dimensional coordinates of the upper arm; and $\theta_{2x}$, $\theta_{2y}$, and $\theta_{2z}$ denote three-dimensional angles of the upper arm.

Further, the host computer control center first stores the information of the patient, including age, gender, a condition of the patient diagnosed by a doctor, the arm position and posture data acquired by the position trackers during rehabilitation, the palm position and posture data, and the pressure distribution data; then, the host computer control center processes the data, including the arm position and posture data of the patient acquired by the position trackers, the palm position and posture data of the patient acquired by the force feedback glove, and the pressure distribution data of the patient acquired by the pressure cushion; and finally, the host computer control center monitors and analyzes whether the patient does the compensatory motion.

The host computer control center transmits the processed upper limb position and posture information of the patient to the interactive display screen to feed back the information in real time to the patient; the host computer control center transmits the analyzed compensatory movement monitoring result to the interactive display screen to feed back the monitoring result in real time to the patient, so as to prompt the patient to actively adjust the posture and suppress the compensatory movement; the host computer control center takes the processed upper limb position and posture information of the patient and the compensatory movement monitoring result as feedbacks of the control system of the upper limb rehabilitation robot, and suppresses the compensatory movement of the patient by adjusting a movement velocity, a movement range and an auxiliary force of the upper limb rehabilitation robot for driving the arm of the patient to train.

Further, the compensatory movement monitoring result includes two parts: an arm compensation analysis and a trunk compensation analysis; the process is as follows:
(1) an arm compensation of the patient is analyzed according to the arm position and posture data of the patient; a position deviation D of the arm is calculated when the patient respectively uses an affected side and a healthy side to complete the same motion, including a position deviation $D_1$ of the forearm and a position deviation $D_2$ of the upper arm; the greater the value D is, the more serious the arm compensation of the patient is, $$D_1 = \sqrt{\begin{array}{l}((x_1(\text{healthy side}) - x_1(\text{affected side}))^2 + \\ (y_1(\text{healthy side}) - y_1(\text{affected side}))^2 + \\ (z_1(\text{healthy side}) - z_1(\text{affected side}))^2)\end{array}};$$

$$D_2 = \sqrt{\begin{array}{l}((x_2(\text{healthy side}) - x_2(\text{affected side}))^2 + \\ (y_2(\text{healthy side}) - y_2(\text{affected side}))^2 + \\ (z_2(\text{healthy side}) - z_2(\text{affected side}))^2)\end{array}};$$

$$D = D_1 + D_2;$$

wherein $x_1$(healthy side), $y_1$(healthy side), and $z_1$(healthy side) are three-dimensional coordinates of the forearm on the healthy side; $x_1$(affected side), $y_1$(affected side), and $z_1$(affected side) are three-dimensional coordinates of the forearm on the affected side; $x_2$(healthy side), $y_2$(healthy side), and $z_2$(healthy side) are three-dimensional coordinates of the upper arm on the healthy side; and $x_2$(affected side), $y_2$(affected side), and $z_2$(affected side) are three-dimensional coordinates of the upper arm on the affected side; and (2) a trunk compensation of the patient is analyzed according to the pressure distribution data of the patient; a relative deviation E of the pressure distribution data is calculated when the patient respectively uses the affected side and the healthy side to complete the same motion; the greater the value E is, the more serious the trunk compensatory-movement of the patient is, $$E = \frac{\sum_{i=1}^{1024} P(i)_{healthy\ side} - \sum_{i=1}^{1024} P(i)_{affected\ side}}{\sum_{i=1}^{1024} P(i)_{affected\ side}} \times 100\%;$$

wherein i is serial numbers of pressure sensing points, i=1, 2, . . . , 1024; P(i) is a pressure value of each pressure sensing point calculated by the pressure cushion according to the resistance change of a resistor; $\Sigma_{i=1}^{1024} P(i)_{healthy\ side}$ is the sum of the pressure values of all the pressure sensing points on the healthy trunk side of the patient calculated by the pressure cushion according to the resistance change of the resistor; and $\Sigma_{i=1}^{1024} P(i)_{affected\ side}$ is the sum of the pressure values of all the pressure sensing points on the affected trunk side of the patient calculated by the pressure cushion according to the resistance change of the resistor.

Further, input data of the interactive display screen derives from the host computer control center, including the upper limb position and posture information of the patient and the compensation monitoring result; on one hand, the interactive display screen can display the upper limb position and posture information of the patient and the compensation monitoring result in real time, and on the other hand, the interactive display screen can instruct the patient to actively suppress the compensatory movement by means of a voice guidance; the interactive display screen stimulates sense organs of the patient by means of vision and voice, so as to arouse the enthusiasm and initiative for rehabilitation training.

Further, the host computer control center is a computer.

Compared with the prior art, the present invention has the following advantages and effects.

The rehabilitation robot training system for monitoring and suppressing the compensatory movement of the hemiplegic upper limb provided by the present invention can monitor and suppress the compensatory movement during rehabilitation training of the hemiplegic upper limb, thereby facilitating the assistance of the patient in correct movements, and promoting the enhancement of the motor function of the hemiplegic upper limb.

DESCRIPTION OF THE EMBODIMENTS

The specific embodiments of the present invention will be further described in detail hereafter with reference to the accompanying drawings. However, the implementation and protection of the present invention are not limited to the specific embodiments. It should be pointed out that the following processes which are not specifically described in detail, if any, can be all realized or understood by a person skilled in the art with reference to the prior art.

Figure 1:
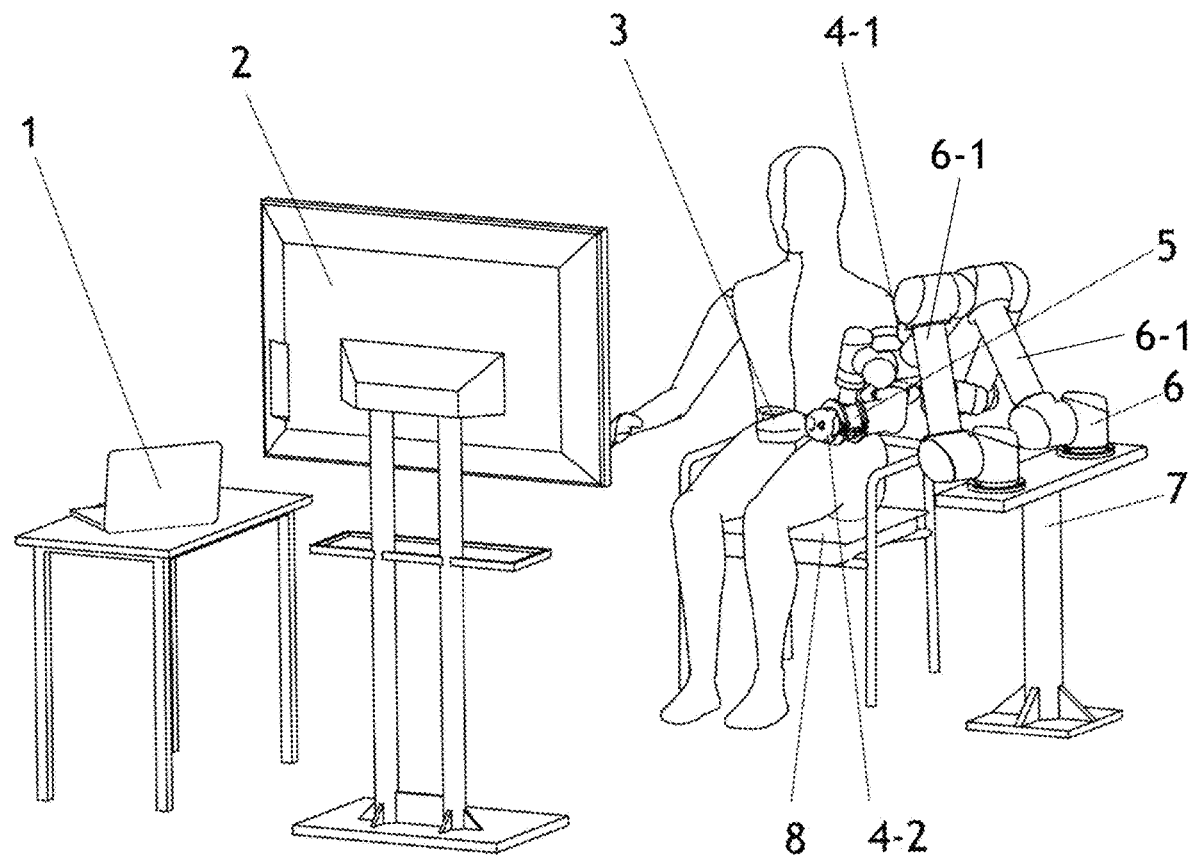
FIG. 1 is a schematic view of a rehabilitation robot training system for monitoring and suppressing a compensatory movement of a hemiplegic upper limb according to one embodiment of the present invention.

As shown in FIG. 1, a rehabilitation robot training system for monitoring and suppressing a compensatory movement of a hemiplegic upper limb, including a host computer control center 1, an interactive display screen 2, a force feedback glove 3, position trackers 4, upper limb rehabilitation robot end connectors 5, an upper limb rehabilitation robot 6, a base 7, and a pressure cushion 8.

The upper limb rehabilitation robot 6 is mounted on the base 7.

One upper limb rehabilitation robot end connector 5 is mounted at an end of each of two robotic arms 6-1 of the upper limb rehabilitation robot 6; the two upper limb rehabilitation robot end connectors are respectively worn on an upper arm and a forearm of a patient arm (the upper limb of the patient), and are used to connect the upper limb rehabilitation robot to the patient arm and drive the patient arm to move during rehabilitation training.

The position tracker 4 includes a first position tracker 4-1 and a second position tracker 4-2; the first position tracker 4-1 and the second position tracker 4-2 are respectively mounted on the forearm and the upper arm of the patient arm, and are used to acquire arm position and posture data of a patient in real time and transmit the acquired arm position and posture data to the host computer control center 1 as a feedback of a control system of the upper limb rehabilitation robot 6, wherein the position tracker 4 can select the HTC VIVE tracker.

The force feedback glove 3 is worn on a hand of the patient, and is used to acquire palm position and posture data of the patient in real time, transmit the palm position and posture data to the host computer control center 1 as the feedback of the control system of the upper limb rehabilitation robot 6, and stimulate the hand of the patient by means of vibration in a game or a task to provide a tactile feedback for the patient, wherein the force feedback glove 3 can select the Manus VR glove.

The pressure cushion 8 is placed on a seat of the patient, and is used to acquire pressure distribution data of the patient in real time, and transmit the pressure distribution data to the host computer control center 1 as the feedback of the control system of the upper limb rehabilitation robot 6; in the present embodiment, the pressure cushion is a Body Pressure Measurement System (BPMS) series #5350 model product made by TEKSCAN. The pressure cushion consists of 32×32, totally 1024 thin film pressure sensing point arrays; when the pressure sensing points sense a pressure, an electronic circuit is switched on, and the pressure value P(i) of each pressure sensing point is calculated according to the resistance change of a resistor, wherein i=1, 2, . . . , 1024.

The host computer control center 1 is used to store information of the patient, process the data, and monitor and analyze whether the patient does a compensatory motion.

The interactive display screen 2 is placed in front of the patient, and is used to display in real time upper limb position and posture information of the patient and a compensation monitoring result, and instruct the patient to suppress the compensatory movement through a voice guidance.

Figure 2:
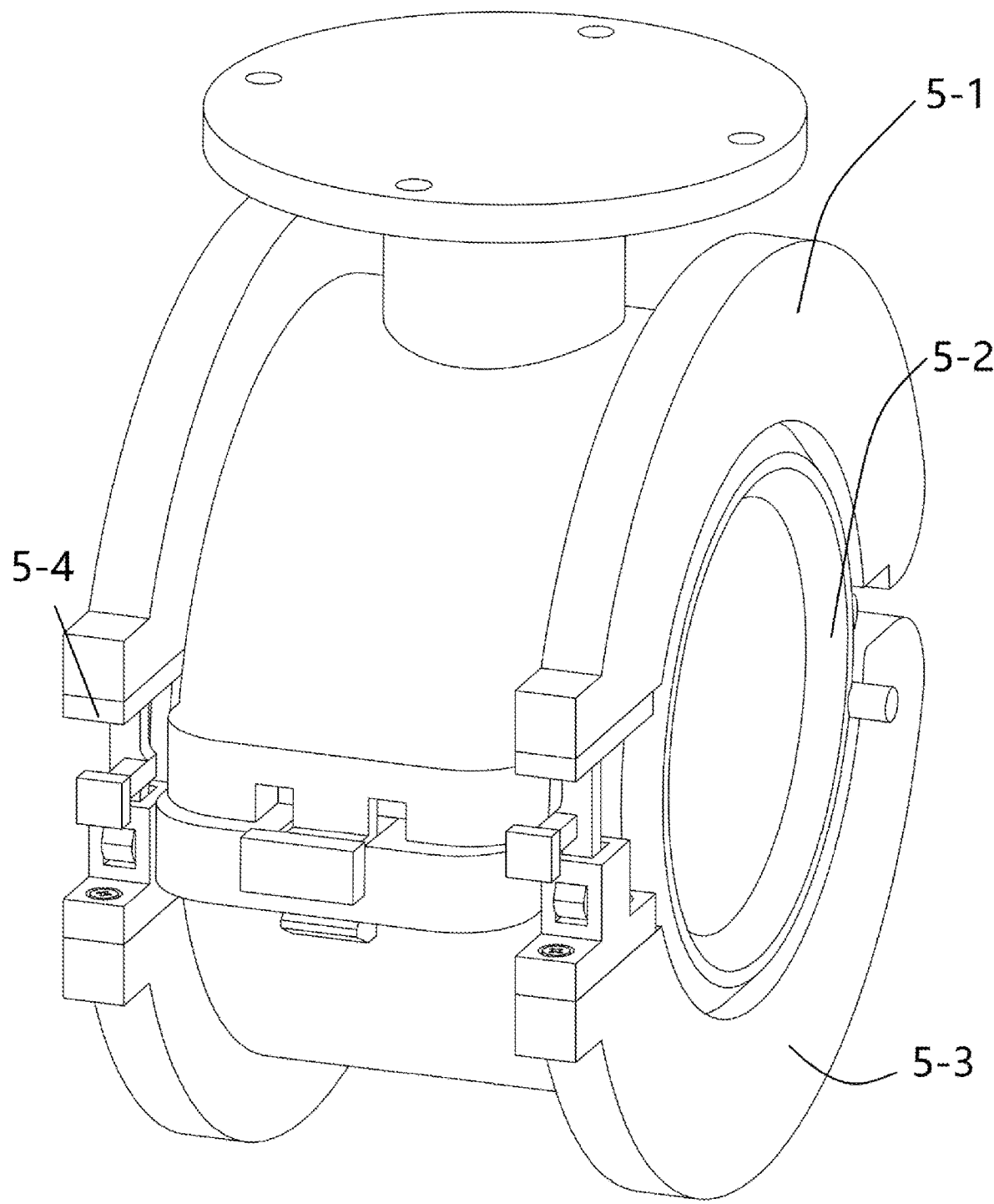
FIG. 2 is a structural schematic view of the upper limb rehabilitation robot end connector according to one embodiment of the present invention.

In the present embodiment, as shown in FIG. 2, the upper limb rehabilitation robot end connector 5 includes an upper part of the end connector 5-1, an inner ring of the end connector 5-2, a lower part of an outer ring of the end connector 5-3, and an end connector clamping fastener 5-4. The upper part of the end connector 5-1 is connected to the lower part of an outer ring of the end connector 5-3 by means of the end connector clamping fastener 5-4, facilitating use; and the inner ring of the end connector 5-2 is an inflatable inner ring, ensuring the comfort of the patient arm.

Further, the upper limb rehabilitation robot 6 is respectively connected to the upper arm and the forearm of the patient by means of the upper limb rehabilitation robot end connectors 5, and drives the arm of the patient to perform rehabilitation training; and the upper limb rehabilitation robot 6 adjusts a movement velocity, a movement range and an auxiliary force for driving the arm of the patient to train, and suppresses the compensatory movement of the patient.

Further, upper limb position and posture information of the patient includes the arm position and posture data of the patient acquired by the first position tracker 4-1 and the second position tracker 4-2 and the palm position and posture data of the patient acquired by the force feedback glove 3.

Further, the arm position and posture data of the patient acquired in real time by the first position tracker 4-1 and the second position tracker 4-2 includes the position and posture of the forearm $(x_1, y_1, z_1, \theta_{1x}, \theta_{1y}, \theta_{1z})$ and the position and posture of the upper arm $(x_2, y_2, z_2, \theta_{2x}, \theta_{2y}, \theta_{2z})$, wherein $x_1$, $y_1$, and $z_1$ denote three-dimensional coordinates of the forearm; $\theta_{1x}$, $\theta_{1y}$, and $\theta_{1z}$ denote three-dimensional angles of the forearm; $x_2$, $y_2$, and $z_2$ denote three-dimensional coordinates of the upper arm; and $\theta_{2x}$, $\theta_{2y}$, and $\theta_{2z}$ denote three-dimensional angles of the upper arm.

Further, the host computer control center 1 first stores the information of the patient, including age, gender, a condition of the patient diagnosed by a doctor, the arm position and posture data acquired by the position trackers during rehabilitation, the palm position and posture data, and the pressure distribution data; then, the host computer control center processes the data, including the arm position and posture data of the patient acquired by the position trackers 4, the palm position and posture data of the patient acquired by the force feedback glove 3, and the pressure distribution data of the patient acquired by the pressure cushion 8; and finally, the host computer control center monitors and analyzes whether the patient does a compensatory motion;

the host computer control center 1 transmits the processed upper limb position and posture information of the patient to the interactive display screen 2 to feed back the information in real time to the patient; the host computer control center 1 transmits the analyzed compensation monitoring result to the interactive display screen 2 to feed back the monitoring result in real time to the patient, so as to prompt the patient to actively adjust the posture and suppress the compensatory movement; the host computer control center 1 takes the processed upper limb position and posture information of the patient and the compensation monitoring result as feedbacks of the control system of the upper limb rehabilitation robot 6, and suppresses the compensatory movement of the patient by adjusting a movement velocity, a movement range and an auxiliary force of the upper limb rehabilitation robot 6 for driving the arm of the patient to train.

Further, the compensatory movement monitoring result includes two parts: an arm compensation analysis and a trunk compensation analysis; the process is as follows:

(1) an arm compensation of the patient is analyzed according to the arm position and posture data of the patient; a position deviation D of the arm is calculated when the patient respectively uses an affected side and a healthy side to complete the same motion, including a position deviation $D_1$ of the forearm and a position deviation $D_2$ of the upper arm; the greater the value D is, the more serious the arm compensatory-movement of the patient is, $$D_1 = \sqrt{\begin{array}{l}((x_1(\text{healthy side}) - x_1(\text{affected side}))^2 + \\ (y_1(\text{healthy side}) - y_1(\text{affected side}))^2 + \\ (z_1(\text{healthy side}) - z_1(\text{affected side}))^2)\end{array}};$$

$$D_2 = \sqrt{\begin{array}{l}((x_2(\text{healthy side}) - x_2(\text{affected side}))^2 + \\ (y_2(\text{healthy side}) - y_2(\text{affected side}))^2 + \\ (z_2(\text{healthy side}) - z_2(\text{affected side}))^2)\end{array}};$$

$$D = D_1 + D_2;$$

wherein $x_1$(healthy side), $y_1$(healthy side), and $z_1$(healthy side) are three-dimensional coordinates of the forearm on the healthy side; $x_1$(affected side), $y_1$(affected side), and $z_1$(affected side) are three-dimensional coordinates of the forearm on the affected side; $x_2$(healthy side), $y_2$(healthy side), and $z_2$(healthy side) are three-dimensional coordinates of the upper arm on the healthy side; and $x_2$(affected side), $y_2$(affected side), and $z_2$(affected side) are three-dimensional coordinates of the upper arm on the affected side; and (2) a trunk compensation of the patient is analyzed according to the pressure distribution data of the patient; a relative deviation E of the pressure distribution data is calculated when the patient respectively uses the affected side and the healthy side to complete the same motion; the greater the value E is, the more serious the trunk compensatory-movement of the patient is, $$E = \frac{\sum_{i=1}^{1024} P(i)_{healthy\ side} - \sum_{i=1}^{1024} P(i)_{affected\ side}}{\sum_{i=1}^{1024} P(i)_{affected\ side}} \times 100\%;$$

wherein i is serial numbers of pressure sensing points, i=1, 2, . . . , 1024; P(i) is a pressure value of each pressure sensing point calculated by the pressure cushion according to the resistance change of a resistor; $\Sigma_{i=1}^{1024} P(i)_{healthy\ side}$ is the sum of the pressure values of all the pressure sensing points on the healthy trunk side of the patient calculated by the pressure cushion according to the resistance change of the resistor; and $\Sigma_{i=1}^{1024} P(i)_{affected\ side}$ is the sum of the pressure values of all the pressure sensing points on the affected trunk side of the patient calculated by the pressure cushion according to the resistance change of the resistor.

Further, input data of the interactive display screen 2 derives from the host computer control center 1, including the upper limb position and posture information of the patient and the compensatory movement monitoring result; on one hand, the interactive display screen 2 can display in real time the upper limb position and posture information of the patient and the compensation monitoring result, and on the other hand, the interactive display screen can instruct the patient to actively suppress the compensatory movement by means of a voice guidance; the interactive display screen 2 stimulates sense organs of the patient by means of vision and voice, so as to arouse the enthusiasm and initiative for rehabilitation training.

Further, the host computer control center 1 is a computer.

According to the above content of the specification, a person skilled in the art can vary and modify the above embodiments. Therefore, the present invention is not limited to the specific embodiments disclosed and described above, and the modifications and variations made to the present invention should also fall into the protection scope of the claims of the present invention.

What is claimed is:

1. A rehabilitation robot training system for monitoring and suppressing compensatory movement of hemiplegic upper limb, comprising a host computer control center, an interactive display screen, a force feedback glove, position trackers, upper limb rehabilitation robot end connectors, an upper limb rehabilitation robot, a base, and a pressure cushion, wherein the upper limb rehabilitation robot is mounted on the base;

the upper limb rehabilitation robot comprises two robotic arms, each of the two robotic arms has a first end connected to the base and a second end connected to one of the upper limb rehabilitation robot end connectors, a first end connector of the upper limb rehabilitation robot end connectors is configured to be worn on an upper arm of an upper limb of a patient and a second end connector of the upper limb rehabilitation robot end connectors is configured to be worn on a forearm of the upper limb of the patient; wherein the upper limb rehabilitation robot is used to drive the upper limb of the patient during rehabilitation training;

the position trackers comprise a first position tracker and a second position tracker; the first position tracker and the second position tracker are respectively configured to be mounted on the forearm and the upper arm of the upper limb of the patient, and are used to acquire arm position and posture data of the patient in real time and transmit the acquired arm position and posture data to the host computer control center as a feedback of a control system of the upper limb rehabilitation robot;

the force feedback glove is configured to be worn on a hand of the patient, and is used to acquire palm position and posture data of the patient in real time, transmit the palm position and posture data to the host computer control center as the feedback of the control system of the upper limb rehabilitation robot, and stimulate the hand of the patient by means of vibration in a game or a task to provide a tactile feedback for the patient;

the pressure cushion is placed on a seat of the patient, and is used to acquire pressure distribution data of the patient in real time, and transmit the pressure distribution data to the host computer control center as the feedback of the control system of the upper limb rehabilitation robot;

the host computer control center is used to store information of the patient, process the data, and monitor and analyze whether the patient does a compensatory movement; and the interactive display screen is placed in front of the patient, and is used to display position and posture information of the upper limb of the patient and a compensation monitoring result in real time, and instruct the patient to suppress the compensatory movement through a voice guidance.

2. The rehabilitation robot training system for monitoring and suppressing compensatory movement of hemiplegic upper limb according to claim 1, wherein the upper limb rehabilitation robot is configured to be connected to the upper arm and the forearm of the patient by means of the upper limb rehabilitation robot end connectors, and drives the upper limb of the patient to perform rehabilitation training; and the upper limb rehabilitation robot adjusts a movement velocity, a movement range and an auxiliary force for driving the upper limb of the patient to move, and suppresses the compensatory movement of the patient.

3. The rehabilitation robot training system for monitoring and suppressing compensatory movement of hemiplegic upper limb according to claim 1, wherein the position and posture information of the upper limb of the patient is acquired by the first position tracker and the second position tracker, and the palm position and posture data of the patient are acquired by the force feedback glove.

4. The rehabilitation robot training system for monitoring and suppressing compensatory movement of hemiplegic upper limb according to claim 3, wherein the arm position and posture data of the patient acquired in real time by the first position tracker and the second position tracker comprises a position and posture of the forearm ($x_1$, $y_1$, $z_1$, $\theta_{1x}$, $\theta_{1y}$, $\theta_{1z}$), and a position and posture of the upper arm ($x_2$, $y_2$, $z_2$, $\theta_{2x}$, $\theta_{2y}$, $\theta_{2z}$), wherein $x_1$, $y_1$, and $z_1$ denote three-dimensional coordinates of the forearm; $\theta_{1x}$, $\theta_{1y}$, and $\theta_{1z}$ denote three-dimensional angles of the forearm; $x_2$, $y_2$, and $z_2$ denote three-dimensional coordinates of the upper arm; and $\theta_{2x}$, $\theta_{2y}$, and $\theta_{2z}$ denote three-dimensional angles of the upper arm.

5. The rehabilitation robot training system for monitoring and suppressing compensatory movement of hemiplegic upper limb according to claim 1, wherein the host computer control center first stores information of the patient, including age, gender, a condition of the patient diagnosed by a doctor, the arm position and posture data acquired by the position trackers during rehabilitation, the palm position and posture data, and the pressure distribution data; then, the host computer control center processes the data, including the arm position and posture data of the patient acquired by the position trackers, the palm position and posture data of the patient acquired by the force feedback glove, and the pressure distribution data of the patient acquired by the pressure cushion; and finally, the host computer control center monitors and analyzes whether the patient does a compensatory motion;

the host computer control center transmits the position and posture information of the upper limb of the patient which is processed to the interactive display screen to feed back the information in real time to the patient; the host computer control center transmits the analyzed compensation monitoring result to the interactive display screen to feed back the monitoring results in real time to the patient, so as to prompt the patient to actively adjust the posture and suppress the compensatory movement; the host computer control center takes the position and posture information of the upper limb of the patient which is processed and the compensation monitoring result as feedbacks of the control system of the upper limb rehabilitation robot, and suppresses the compensatory movement of the patient by adjusting a movement velocity, a movement range and an auxiliary force of the upper limb rehabilitation robot for driving the upper limb of the patient to move.

6. The rehabilitation robot training system for monitoring and suppressing compensatory movement of hemiplegic upper limb according to claim 5, wherein the compensatory movement monitoring result comprises two parts: an arm compensation analysis and a trunk compensation analysis; a process is as follows:

an arm compensation of the patient is analyzed according to the arm position and posture data of the patient; a position deviation D of the upper limb is calculated when the patient respectively uses an affected side and a healthy side to complete a same motion, including a position deviation $D_1$ of the forearm and a position deviation $D_2$ of the upper arm; the greater the value D is, the more serious the arm compensation of the patient is, $$D_1 = \sqrt{\begin{aligned}&((x_1(\text{healthy side}) - x_1(\text{affected side}))^2 + \\ &(y_1(\text{healthy side}) - y_1(\text{affected side}))^2 + \\ &(z_1(\text{healthy side}) - z_1(\text{affected side}))^2)\end{aligned}};$$

$$D_2 = \sqrt{\begin{aligned}&((x_2(\text{healthy side}) - x_2(\text{affected side}))^2 + \\ &(y_2(\text{healthy side}) - y_2(\text{affected side}))^2 + \\ &(z_2(\text{healthy side}) - z_2(\text{affected side}))^2)\end{aligned}};$$

$$D = D_1 + D_2;$$

wherein $x_1$ (healthy side), $y_1$ (healthy side), and $z_1$ (healthy side) are three-dimensional coordinates of the forearm on the healthy side; $x_1$ (affected side), $y_1$ (affected side), and $z_1$ (affected side) are three-dimensional coordinates of the forearm on the affected side; $x_2$ (healthy side), $y_2$ (healthy side), and $z_2$ (healthy side) are three-dimensional coordinates of the upper arm on the healthy side; and $x_2$ (affected side), $y_2$ (affected side), and $z_2$ (affected side) are three-dimensional coordinates of the upper arm on the affected side; and a trunk compensation of the patient is analyzed according to the pressure distribution data of the patient; a relative deviation E of the pressure distribution data is calculated when the patient respectively uses the affected side and the healthy side to complete the same motion; the greater the value E is, the more serious the trunk compensation of the patient is, $$E = \frac{\sum_{i=1}^{1024} P(i)_{healthy\ side} - \sum_{i=1}^{1024} P(i)_{affected\ side}}{\sum_{i=1}^{1024} P(i)_{affected\ side}} \times 100\%;$$

wherein i is serial numbers of pressure sensing points, i=1,2, ..., 1024; P (i) is a pressure value of each pressure sensing point calculated by the pressure cushion according to the resistance change of a resistor; $\Sigma_{i=1}^{1024}P(i)_{healthy\ side}$ is the sum of the pressure values of all the pressure sensing points on the healthy side of the patient calculated by the pressure cushion according to the resistance change of the resistor; and $\Sigma_{i=1}^{1024}P(i)_{affected\ side}$ is the sum of the pressure values of all the pressure sensing points on the affected side of the patient calculated by the pressure cushion according to the resistance change of the resistor.

7. The rehabilitation robot training system for monitoring and suppressing compensatory movement of hemiplegic upper limb according to claim 1, wherein input data of the interactive display screen derives from the host computer control center, including the position and posture information of the upper limb of the patient and the compensation monitoring result; for one thing, the interactive display screen displays the position and posture information of the upper limb of the patient and the compensation monitoring result in real time, and for another thing, the interactive display screen instructs the patient to actively suppress the compensatory movement by means of a voice guidance; the interactive display screen stimulates sense organs of the patient by means of vision and voice, so as to arouse the enthusiasm and initiative for rehabilitation training.

8. The rehabilitation robot training system for monitoring and suppressing compensatory movement of hemiplegic upper limb according to claim 1, wherein the host computer control center is a computer.

* * * * *